US010681249B2

(12) United States Patent
Clarke (10) Patent No.: US 10,681,249 B2
(45) Date of Patent: Jun. 9, 2020

(54) FILM SCANNING METHOD AND APPARATUS DETERMINING IMAGE OFFSET FROM IMAGED FILM TRANSPORT PERFORATIONS

(71) Applicant: Blackmagic Design Pty Ltd, Port Melbourne (AU)

(72) Inventor: Thomas Richard Clarke, Luton (GB)

(73) Assignee: Blackmagic Design Pty Ltd, Port Melbourne (AU)

( * ) Notice: Subject to any disclaimer, the term of this patent is extended or adjusted under 35 U.S.C. 154(b) by 0 days.

(21) Appl. No.: 15/959,035

(22) Filed: Apr. 20, 2018

(65) Prior Publication Data

US 2018/0309905 A1   Oct. 25, 2018

(30) Foreign Application Priority Data

Apr. 21, 2017 (AU) .................................. 2017901469

(51) Int. Cl.
*H04N 3/36* (2006.01)
*H04N 3/38* (2006.01)
*H04N 5/253* (2006.01)

(52) U.S. Cl.
CPC ................. *H04N 3/36* (2013.01); *H04N 3/38* (2013.01); *H04N 5/253* (2013.01)

(58) Field of Classification Search
CPC .. H04N 3/36; H04N 3/38; H04N 3/40; H04N 5/253
See application file for complete search history.

(56) References Cited

U.S. PATENT DOCUMENTS

| 2,818,467 | A | * | 12/1957 | Alvin | ....................... H04N 3/40 250/224 |
| 4,875,102 | A | * | 10/1989 | Poetsch | .................... H04N 3/38 348/97 |
| 5,430,478 | A | * | 7/1995 | Kaye | ........................ H04N 3/36 348/108 |
| 5,555,092 | A | * | 9/1996 | Kaye | ........................ H04N 3/36 348/107 |
| 5,650,816 | A | | 7/1997 | Mead | |
| 5,943,090 | A | * | 8/1999 | Eiberger | ................ H04N 5/253 348/96 |

(Continued)

FOREIGN PATENT DOCUMENTS

| GB | 2327825 A | * | 2/1999 | ............... G03B 1/42 |
| GB | 2335817 A | * | 9/1999 | ............... H04N 3/38 |
| WO | WO-2016156798 A1 | * | 10/2016 | ........... H04N 1/4078 |

*Primary Examiner* — Jamie J Atala
*Assistant Examiner* — Michael Robert Cammarata
(74) *Attorney, Agent, or Firm* — Seed Intellectual Property Law Group LLP (57) ABSTRACT

Digitization of film, and more particularly film scanning, includes capturing light transmitted through the film so as to acquire a digitized image. This includes a captured frame comprising a digitized image of at least a portion of at least one image frame of a sequence of image frames, and at least a portion of one or more transport perforations. The method can further include determining an image offset corresponding to at least the captured frame on the basis of a comparison between at least one detected edge in the captured image and a corresponding datum location. A signal representing the image offset can be generated to enable alignment of at least the captured frame.

19 Claims, 6 Drawing Sheets

(56) References Cited

U.S. PATENT DOCUMENTS

| | | | | |
|---|---|---|---|---|
| 5,995,197 | A * | 11/1999 | Yoshino | G03B 27/6285 355/40 |
| 6,081,293 | A * | 6/2000 | Brown | G03B 1/22 348/97 |
| 6,169,571 | B1 * | 1/2001 | Rivers | H04N 3/38 348/96 |
| 9,661,236 | B2 * | 5/2017 | Howell | H04N 1/19594 |
| 2001/0048766 | A1 * | 12/2001 | Young, Jr. | H04N 1/00267 382/170 |
| 2003/0011748 | A1 * | 1/2003 | Varian | H04N 5/253 352/244 |
| 2005/0061845 | A1 * | 3/2005 | Anderle | G03B 1/04 226/24 |
| 2007/0253537 | A1 * | 11/2007 | Tenbrock | G03B 1/24 378/173 |
| 2008/0067395 | A1 * | 3/2008 | Loew | H04N 3/38 250/393 |
| 2010/0149328 | A1 * | 6/2010 | Cieslinski | H04N 3/36 348/98 |
| 2013/0076890 | A1 * | 3/2013 | Bovee | H04N 3/38 348/97 |

* cited by examiner

FILM SCANNING METHOD AND APPARATUS DETERMINING IMAGE OFFSET FROM IMAGED FILM TRANSPORT PERFORATIONS

BACKGROUND

Technical Field

The present disclosure relates to digitization of film, and more particularly to film scanning.

Description of the Related Art

Film scanning is the process by which the frames of a film are converted into digital form in order to create video data. U.S. Pat. No. 5,650,816 in the name of Rank Cintel Limited described a mechanism for the correction of film instability in film scanning equipment. This patent, the disclosure of which is incorporated herein by reference, is described in the context of a telecine which converts film images to a video signal but may also be applied to cameras. However, the instability problems that are addressed by that patent can also exist in film scanners which digitize the scanned film for storage in a data storage system.

Generally speaking, a film scanner includes a light source and a receiver placed on opposite sides of a film path. The film to be scanned is moved by a highly precise transport mechanism past the light source and receiver, and each frame film is sequentially scanned. The scanning is performed by activating the light source and transmitting light through the film such that it is received by the receiver. In modern film scanners, films are scanned on a frame by frame basis, such that a whole frame of the film is captured simultaneously using a two-dimensional wide field receiver, which is typically a charge-coupled-device (CCD) or CMOS image capture chip. As discussed in U.S. Pat. No. 5,650,816, it is of fundamental importance when scanning film, that each of the frames can be placed in correct registration with each other frame. Otherwise, the resulting video signals or video data will appear to be unstable, in the sense that the film sequence will appear to move around when played back. U.S. Pat. No. 5,650,816 addresses the problem by generating a correction signal that adjusts the position of the scanning means to shift the position of the scan with respect to the film in order to correct for measured unsteadiness in the scanning process. However, the feedback mechanism used in that patent can only partially correct for image instability as the true instability varies from frame to frame and may change from one frame to a successive frame.

The present disclosure thus seeks to address this drawback or at least provide an alternative mechanism to it. Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

BRIEF SUMMARY

In a first aspect, the present disclosure provides a method of scanning a film of the type including a film substrate carrying a sequence of image frames and a multiplicity of transport perforations spaced apart along the film at a location adjacent the sequence of image frames in a predetermined positional relationship with said image frames. The method includes:

illuminating a portion of the film including at least a portion of one or more image frames to be scanned;

capturing light transmitted through the film so as to acquire a digitized image including a captured frame comprising a digitized image of at least a portion of at least one of said image frames, and at least a portion of one or more of said transport perforations;

processing the digitized image to detect the location of at least one edge of at least one of said transport perforations;

determining an image offset corresponding to at least the captured frame on the basis of a comparison between at least one of said detected edges and a corresponding datum location; and generating a signal representing the image offset to enable alignment of at least the captured frame.

The transport perforations in the film will typically comprise a series of perforations spaced apart in a line along the length of the film. Absent any damage, degradation or manufacturing defects the shape and position of the perforations will typically be standardized.

Processing the digitized image to detect the location of at least one edge of at least one of said transport perforations, can include, within a region of interest within the digitized image:

detecting at least one edge within the region of interest; and comparing at least a subset of the detected edges to a plurality of datum locations representing the expected location of an edge.

The method can further comprise detecting edges extending in a direction transverse to the length of the film.

As will be appreciated, the digitized image will include a plurality of pixel values representing the intensity of light received at a corresponding location on an image sensor. In this case, detecting edges in a direction transverse to the length of the film can include averaging a plurality of pixel values within the region of interest in plurality of bands running transverse to the length of the film, to generate an array containing a corresponding plurality values each corresponding to different location along the length of the film. The method can further include processing the array to detect edges. In a preferred form, the method can include applying an edge detection filter to the array. A plurality of edge detection filters of different lengths can be applied.

Determining the image offset on the basis of a comparison between at least one of said detected edges and a corresponding datum location, can include, for a plurality of detected edges, comparing the location of the edges to a plurality of datum locations and determining an image offset for the plurality of edges.

The method can include determining a first plurality of detected edges, and comparing the edges to a second plurality of datum locations, wherein the number of detected edges exceeds the number of datum locations; and selecting a subset of detected edges from the first plurality of edges from which to determine the image offset.

The method can include, for each edge in the selected subset of detected edges, determining an offset from a corresponding datum location. Determining an image offset is preferably performed on the basis of a plurality of said offsets. This can be performed by determining a measure of central tendency of the determined offsets and determining an image offset on the basis of those detected edges within a predefined distance from said central tendency measure.

In other embodiments, determining an image offset on the basis of a comparison between at least one of said detected edges and a corresponding datum location, can include determining a correlation between the output of an edge detection filter and a plurality of datum locations representing the expected location of an edge.

The offset producing the best correlation between the output of the edge detection filter and a plurality of datum locations can preferably be used as the image offset.

The methods described above can include determining a fault condition, preferably indicating that the film is damaged, degraded or soiled, in the event that a detected edge exists which has a higher amplitude than an edge within the subset of detected edges from which the image offset is determined.

In one form, generating a signal representing the image offset enables alignment of successive captured frames in a reproduction of the digitized images of successive captured frame. This method can include generating metadata representing the image offset to be applied to a captured frame. Preferably, the metadata is stored in a datafile with data representing the captured frame.

In one form, generating a signal representing the image offset to enable alignment of successive image frames in a reproduction of the digitized images of captured frames, can include generating a control signal to be applied to a video reproduction apparatus, for directly adjusting the relative position of successive captured frames during image reproduction.

In a second aspect of the present disclosure, there is provided a method of identifying a fault in a process of scanning a film of the type including a film substrate carrying a sequence of image frames and a multiplicity of transport perforations spaced apart along the film at a location adjacent the sequence of image frames in a predetermined positional relationship with said image frames. The method can include: illuminating a portion of the film including at least a portion of one or more image frames to be scanned; capturing light transmitted through the film so as to acquire an digitized image including, a captured frame comprising a digitized image of at least a portion of at least one of said image frames, and at least a portion of one or more of said transport perforations; processing the digitized image to detect the location of at least one edge of at least one of said transport perforations; determining a first plurality of detected edges, and comparing the edges to a second plurality of datum locations, wherein the number of detected edges exceeds the number of datum locations; and selecting a subset of detected edges from the first plurality of edges from which to determine the image offset, and determining a fault condition in the event that a detected edge exists which has a higher amplitude than an edge within the selected subset of detected edges. The method may include sending a signal indicating a fault condition.

In a further aspect, there is provided a film scanning apparatus including: a light source; an image capture system arranged to capture light transmitted through the film so as to acquire an digitized image including, captured frame comprising a digitized image of at least a portion of at least one of said image frames, and at least a portion of one or more of said transport perforations, data processing system arranged to process acquired image data; said film scanning apparatus being configured to perform a method described herein. A transport system can also be provided to adjust the relative position of the film with respect to the image capture system.

As used herein, except where the context requires otherwise, the term "comprise" and variations of the term, such as "comprising", "comprises" and "comprised", are not intended to exclude further additives, components, integers or steps.

Further aspects of the present disclosure and further embodiments of the aspects described in the preceding paragraphs will become apparent from the following description, given by way of example and with reference to the accompanying drawings.

DETAILED DESCRIPTION

Figure 1:
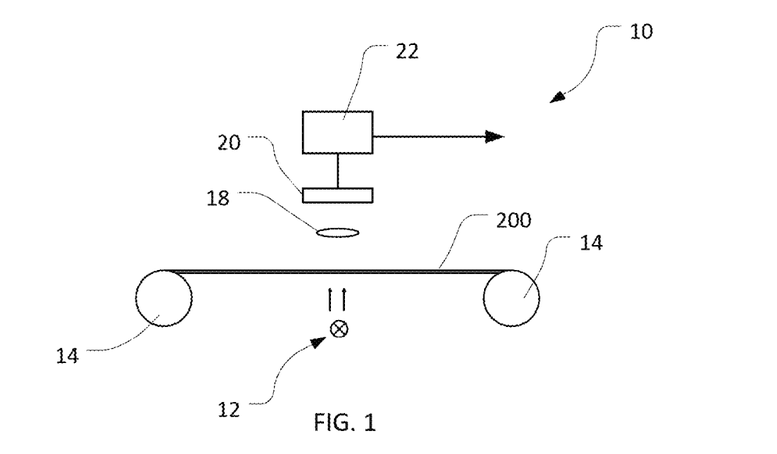
FIG. 1 is a schematic diagram illustrating a film scanning system.

FIG. 1 is a schematic diagram illustrating a film scanning system 10. The film scanning system 10 generally includes:

a light source 12, typically in the form of a lamp or LED illumination system;

a film transport system 14 comprising a series of rollers and film guides for moving the film 200 in a controlled manner during scanning;

an optical system 18, which may include one or more lenses or mirrors for ensuring correct focus of light transmitted through the film from the light source 12; and an imaging system 20, which will typically include a charge coupled device (CCD) or complementary metal oxide semiconductor (CMOS) imaging sensor and related read out hardware. The imaging system is configured to receive light and in turn generate digital data representing the received light at known locations (pixels), so that the image may be reconstructed from the digital output.

A data processing system 22 is also provided. The data processing system 22 may comprise one or more data processors such as an application specific integrated circuit (ASIC) or field programmable gate array (FPGA), microprocessor or the like, and is configured to perform a range of image processing tasks. These can include correction of unwanted optical effects such as lens distortion, common noise reduction, correction of pixel-to-pixel variations in captured image data and others e.g., by removing dead pixels and correcting for conversion efficiency variations between pixels. In the case of imaging system 20, which operates with a color filter array the image processing system 22 may perform demosaicing of the captured image into different color planes, depending on the downstream use of the images and data processing pipeline to be employed. In some embodiments, the data processing system 22 additionally performs image analysis on the digitized image to enable image stabilization to be performed. As would be appreciated, the data processing system 22 will include working memory in order to store data generated by the imaging system 20 and, if appropriate, software applications and/or data libraries and files necessary to perform its data processing functions.

Figure 2:
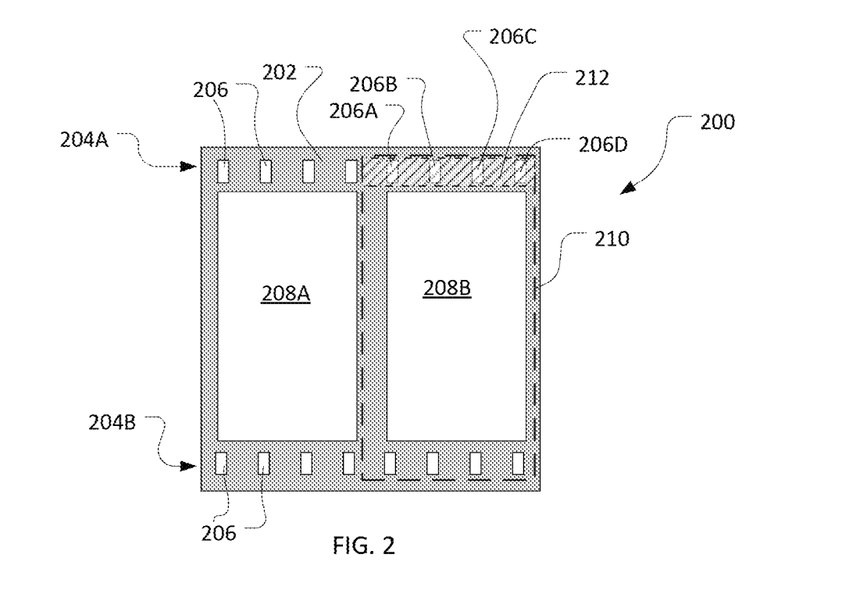
FIG. 2 illustrates an example of a segment of film and regions scanned in an embodiment of the present disclosure.

The process for performing image stabilization will now be described in connection with FIGS. 2-5B. Turning firstly to FIG. 2, which shows a segment of a film 200, the film 200 comprises a substrate 202 on which optical data is stored. Substrate 202 may additionally carry audio tracks encoded in a special region of the film, but this will not be described in further detail here. The film 200 includes a series of perforations 206 down each longitudinal edge 204a and 204b. These perforations are provided to enable the film to be moved by mechanical sprockets during playback and other processes which require movement of the film. In systems such as FIG. 1, the perforations 206 may be used by the transport system 14 to move the film. However, in some embodiments movement of the film may be performed by other mechanisms, such as by clamping between pinch rollers or the like so the film may be transported regardless of whether perforations are damaged or structurally unsound. The film 200 additionally includes a sequence of image frames 208a and 208b. As will be appreciated by those skilled in the art, film stock is typically created according to a known standard. The standard may be defined by a manufacturer or group of manufacturers or an industry body but typically the size and position of the frames and the size and position of the transport perforations and any audio tracks, meta data storage or the like will be known. Importantly, the position of the perforations, and their size relative to the image frame 208b will be known. That is, a theoretical predetermined standard for any given film can be determined.

As will be appreciated by those skilled in the art, the film 200 will typically be substantially longer than illustrated in FIG. 2 and include multiplicity of frames which together form a film sequence. During scanning, the film 200 will be moved past the light source 12, typically in a step-wise fashion, frame by frame. When a frame is aligned with the image capture system 20 and illuminated by the light source, a digital image of a particular image frame is captured. As will be appreciated, the light source may be pulsed or continuously illuminated.

In embodiments of the present disclosure, rather than just capturing an image of only the image frame portion e.g., 208b of the film, the digitized image of a larger region 210 indicated by the dashed box is captured. The shape and size of the region 210 will vary from embodiment to embodiment and may be chosen by a user depending on the particular scanning requirements of a given film. For example, the region 210 can be selected such that a digitized image of more than one image frame (206B, 208B) is captured at a time. In this case, multiple captured frames can be generated from a single image capture process. Conversely, and more commonly, only a portion of a single image frame 208B may be included in the digitized image. In this case, the captured frame will only be a portion of the image frame on the film. This may arise in cases where the aspect ratio of the film's image frames are different to the desired aspect ratio of the digital captured frames, such as when a 16:9 format scan is made from a 4:3 image frame on the film. Within the digitized image, there is defined a region of interest 212 (indicated by diagonal cross hatching in FIG. 2) which includes at least part of a plurality of transport perforations 206a, 206b, 206c and 206d which are adjacent to the frame 208b.

This region of interest 212 is used in further image processing in preferred embodiments to determine the correct alignment of the captured frame, with respect to at least one neighboring captured frame in the sequence.

Based on the standard that applies to the film, a set of theoretical datum locations can be determined for one or more of the edges of the perforations 206a to 206d with respect to the location of the image frame 208b. As will be discussed below, these datum points are used in the present embodiment to determine the correct alignment of the scanned frame 208b with respect to each other scanned image in the film sequence.

As discussed above, in use, as frame 208b is aligned with the image sensor 20 of the film scanner, light is transmitted through the film and a digitized image is acquired of the region 210. Data processing system then selects out the region of interest 212 for further analysis as described below.

In an illustrative embodiment, the image sensor 20 is a CMOS sensor, with a conventional RGB Bayer color filter array applied to it. The output from the image sensor 20 is thus an RGB Bayer mosaic pattern. In the illustrative embodiment, only red pixels from the Bayer pattern are used in image analysis of the region of interest 212. However, in other embodiments, other pixel colors additionally or alternatively may be used. Accordingly, the illustrative examples should not be seen as limiting on the inventive concept. In the illustrative embodiment, the image sensor 20 operates at 4 k resolution and accordingly has a resolution of 4096 pixels in the horizontal direction. The region of interest 212 is set to a width, which due to mechanical tolerances, is always guaranteed to contain film perforations 206a to 206d. In one example, for 35 mm gauge film, the region of interest may be as small as 1% of the width of the scanned region 210, but also may be much larger say up to 10% if greater mechanical tolerances are needed. For example, for a 35 mm gauge film being scanned with a 4 k image sensor 20 the region of interest may be in the vicinity of 30-40 pixels wide, and, as can be seen from FIG. 2 is set at or near a longitudinal edge of the scan region 210 in order to coincide with the perforations. For example, if only the red pixels in a Bayer pattern are considered, the region of interest can comprise pixel numbers 2010 to 2041 of the red Bayer pixels, which extend in a range from 1 to 2048, making the region of interest 32 pixels wide. For a 16 mm gauge film different regions of interest can be used.

It should be noted that although FIG. 2 illustrates only a single region of interest 212 which scans perforations 206a to 206d on one side of the film 20. A second region of interest could similarly be placed at or near the other longitudinal edge of the film. That is, the perforations 206 lying along the edge 204b of the film 200 could alternatively or additionally be used in some embodiments.

FIG. 3 illustrates a sequence of steps of an exemplary method of determining an image position correction output for a scanned image frame 208b.

Figure 3A:
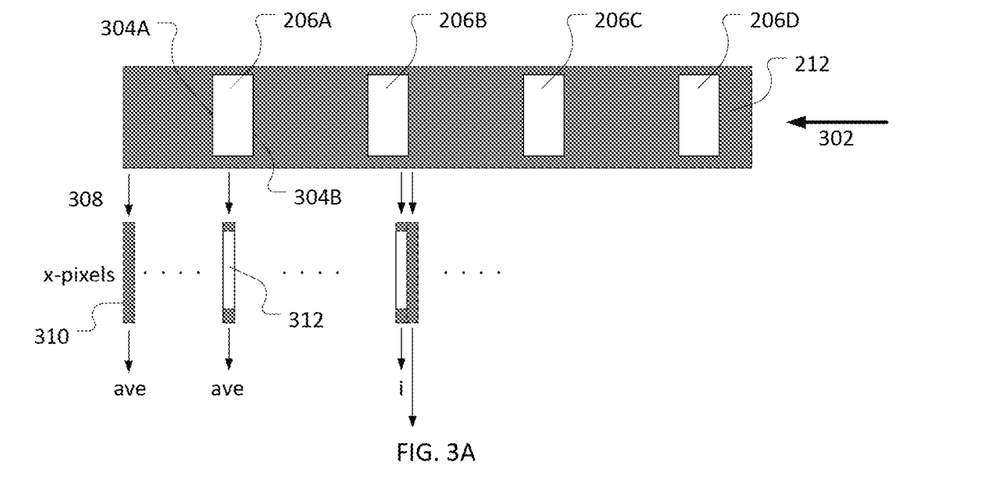
FIG. 3A illustrates a region of interest in which perforation edges are detected in a first embodiment.

FIG. 3A shows the detail of the digital image of the region of interest 212 from FIG. 2. As can be seen, the image of the region of interest contains four transport perforations 206a, 206b, 206c and 206. Arrow 302 shows the longitudinal direction of the film for convenience. Initially, the image of the region of interest 212 is processed for detection of the edges of the perforations 206a-d. In the present example, the edges of interest are the leading and trailing edges that extend transverse to the longitudinal edges of the film. For perforation 206a, these edges are labelled 304a and 304b respectively. In a first process, the pixel values of a series of bands extending transverse to the longitudinal direction of the film are averaged to generate a series of values. In FIG. 3A all of the pixels in band 310 are averaged to give a single value, similarly all of the pixels in band 312 are averaged to generate a single value. This is extended for all i bands along the length of the region of interest 212.

Figure 3B:
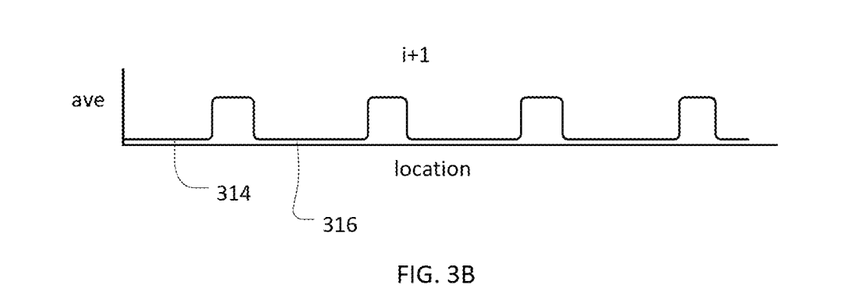
FIG. 3B illustrates the output of an averaging process performed on bands within the region of interest.
Figure 3C:
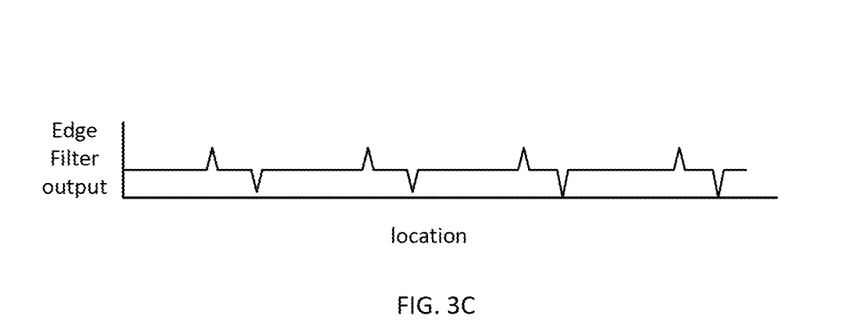
FIG. 3C shows the output of an edge detection filter on the averaged data from FIG. 3B.

FIG. 3B illustrates a plot of the average pixel value within each band relative to position along the film. In the present example, each band is preferably a single pixel wide. However, for scanners with very high horizontal resolution the bands may be multiple pixels wide (in the longitudinal direction). As can be seen, the regions in which no perforation exist, e.g., region 314 and 316, have relatively low average pixel values, whereas the regions corresponding to the perforations 206a-206d have relatively high average pixel values. The plot of FIG. 3B represents an idealized set of values, and as can be seen the plot is essentially a series of square pulses corresponding to each of the perforations 206a-206d. In reality, because the film is not perfect, ideally square values cannot be achieved in the averaging step. The output of the step of FIG. 3B is in effect a one-dimensional array of average pixel values for corresponding locations along the region of interest. These values are then fed into an edge detection filtering process to identify the location of any detected edges. In a preferred form, a two-stage edge detection filter is applied. The first edge detection filter takes the differences within a forward and backwards window around a particular pixel. In a preferred form, the windows are relatively long, say 8 pixels. Thus the first order filter is of the form

| | Pixel pos'n | | | | | | | | | | | | | | | |
|---|---|---|---|---|---|---|---|---|---|---|---|---|---|---|---|---|
| | i − 8 | i − 7 | i − 6 | i − 5 | i − 4 | i − 3 | i − 2 | i − 1 | i | i + 1 | i + 2 | i + 3 | i + 4 | i + 5 | i + 6 | i + 7 |
| Filter coefficient | −1 | −1 | −1 | −1 | −1 | −1 | −1 | −1 | +1 | +1 | +1 | +1 | +1 | +1 | +1 | +1 |

Figure 3D:
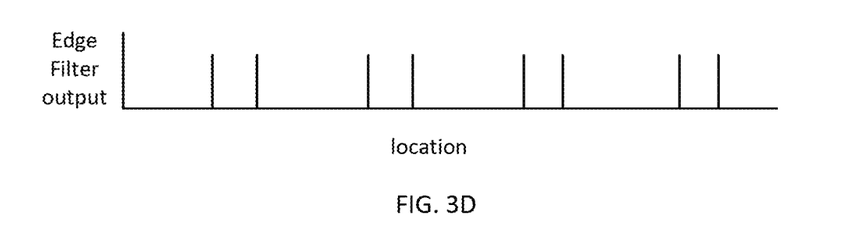
FIG. 3D shows the position of the detected edges.

As will be appreciated, where the average pixel value for a location (the ith pixel location) is reasonably constant, the filter output will average out to a value close to zero, and where rapid changes are occurring, peaks in the output will be generated. The output of the first filter can then be fed into a second order filter which differentiates between positive going edges and negative going edges i.e., edges at the start of the perforation like 304a and edges at the rear of a perforation like 304b. This filter also performs differences, but over a much narrower window. The second order filter is of the form,

| | Pixel pos'n | | | | | |
|---|---|---|---|---|---|---|
| | i − 3 | i − 2 | i − 1 | i | i + 1 | i + 2 |
| Filter coefficient | −1 | −1 | −1 | +1 | +1 | +1 | where the inputs are the outputs from the first filter. The result being an output such as that shown in FIG. 3C. As can be seen, for each edge of the perforation a negative going or positive going peak is output. By thresholding these peaks to identify sufficiently strong edges, and identifying their central location, detected edge locations can be determined. For each of the peaks identified in FIG. 3C, the location of the edge is shown in FIG. 3D.

Figure 3E:
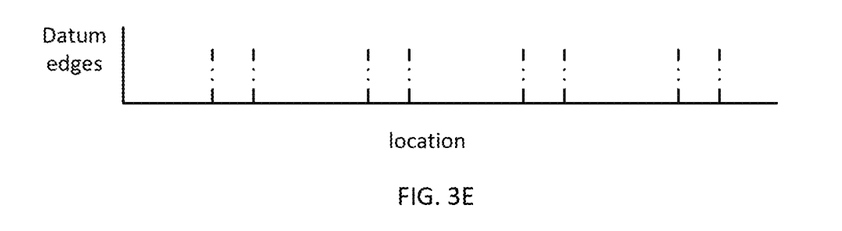
FIG. 3E shows the location of theoretical datum edge locations used in an embodiment.
Figure 3F:
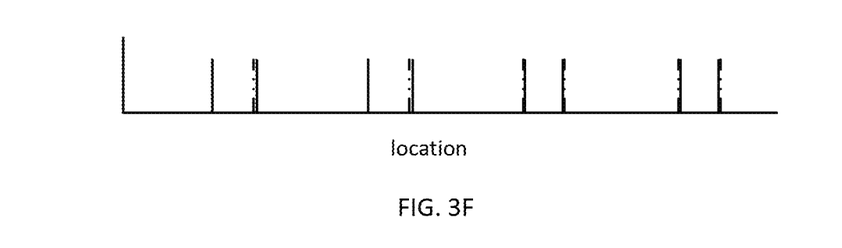
FIG. 3F shows the correlation between the theoretical datum edges and the detected edge locations from FIG. 3D.

As noted above, theoretical datum locations can be determined for any given film type. For the present example, FIG. 3E illustrates the position of eight datum locations representing the expected location of edges in the film illustrated in FIG. 3A. FIG. 3F shows a superposition of the detected edges (solid lines) and the datum locations (dotted lines) for the region of interest 212.

In the next phase of the process, the detected edge locations and datum locations are compared to each other and an image offset value is determined. In the simplest form, this could be achieved by finding the edge offset between each edge and its corresponding datum location, and then averaging the set of edge offsets for all detected edges. In a more sophisticated form, each edge is compared to its corresponding datum location to determine a corresponding set of individual edge offsets. These plurality of individual edge offsets can then be statistically analyzed to determine if any are unreliable and should be excluded from the final calculation of the image offset. This can be performed by determining a measure of central tendency of the individual edge offsets and then determining a threshold distance from the measure of central tendency. All edges being further away from the central measure than the threshold may then be excluded from further processing as they are sufficiently different to all others to be deemed unreliable. In a more concrete example, each of the individual offsets can be grouped in bins according to their determined edge offset, and only those detected edges falling within the modal bin will be used for determining the image offset. An example of such a scheme is explained in further detail below. The example illustrated in FIG. 3 represents an idealized situation with perfect perforations and without the presence of any other complicating factors such as dust or dirt or the like. In the presence of such complicating factors, edges may be hard to detect and spurious edges may also be detected. For example, dust or cracks in the film may appear as edges in the region of interest and accordingly, practical embodiments of the present system may need a means for dealing with the spurious edge detections. FIG. 4 is provided to explain one such process.

The various plots of FIG. 4 correspond to those of FIG. 3 and are labelled accordingly. In order to maintain clarity, full description of these figures will not be provided again. As will be seen in FIG. 4A, the region of interest 212 includes, in addition to the perforations 206a-206d, a feature 400 which may be a tear in the film. The tear 400 will appear as a bright patch in the region of interest and accordingly, will generate another peak 402 in the plot of average pixel values shown in FIG. 4B. When the average values are put into the edge detection filter, an additional pair of edges 404 and 406 will accordingly be detected. Thus the output of the edge detection filter in FIG. 4D will include two additional detected edges compared to the FIG. 3 embodiment. However, as would be appreciated, these edges do not correspond to the edges in the datum set illustrated in FIG. 4E. Such edges can be identified and rejected as follows.

Figure 4A:
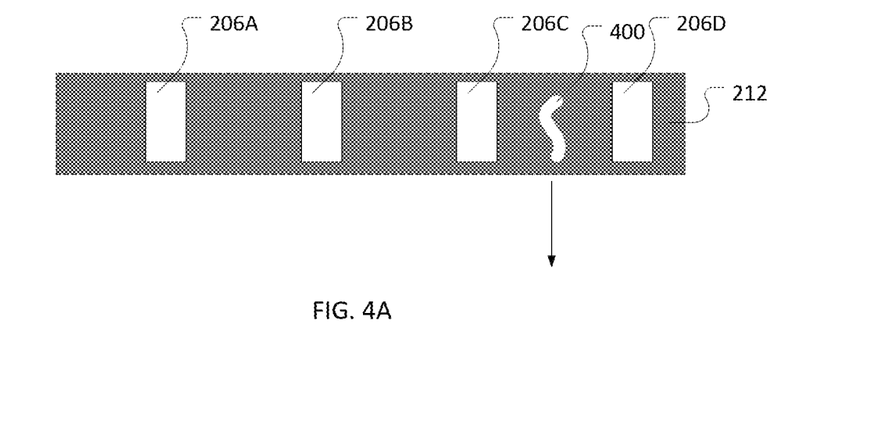
FIGS. 4A-4F illustrate figures equivalent to that of FIGS. 3A-3F in which an artefact in the region of interest causes the detection of spurious edges.
Figure 4B:
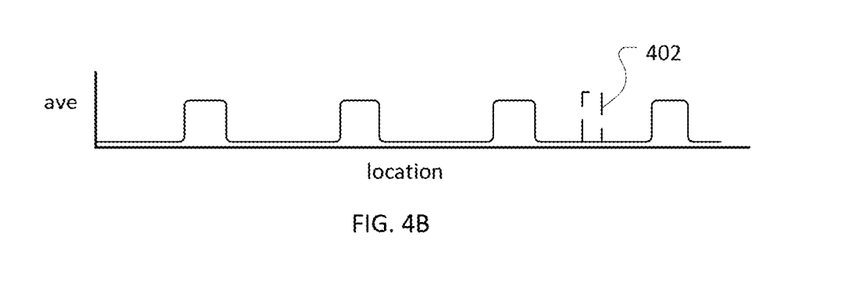
Figure 4C:
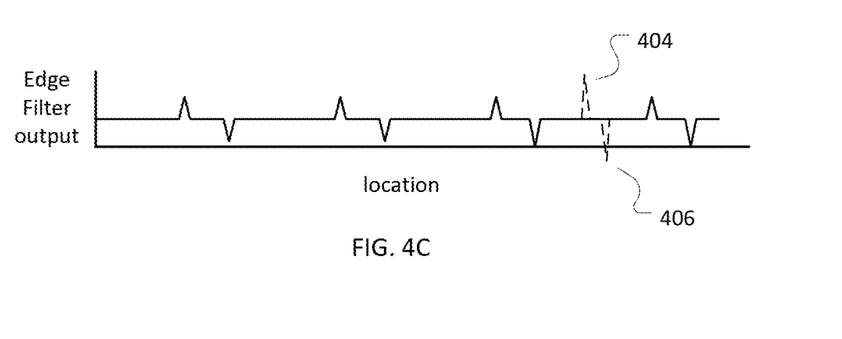
Figure 4D:
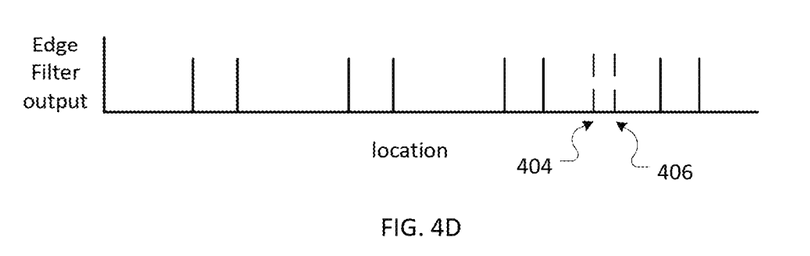
Figure 4E:
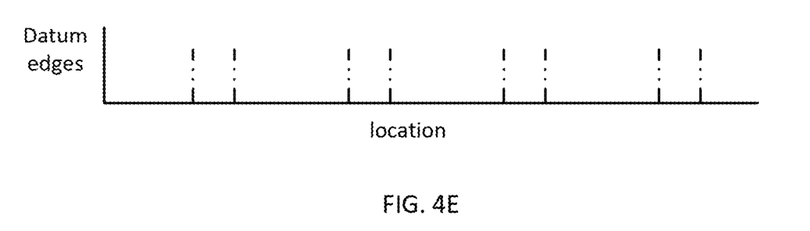
Figure 4F:
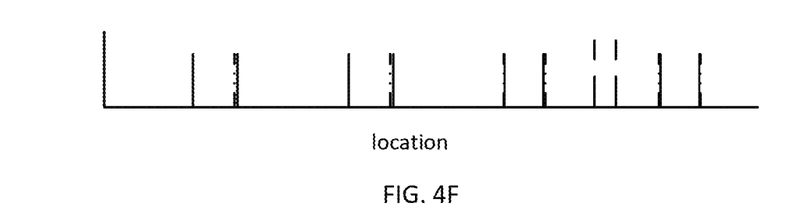

Firstly, a first plurality of candidate detected edges is determined. This set of candidate detected edges could for example be all detected edges having a strength over predetermined threshold, or the n strongest edges detected in the region of interest. This first plurality of edges are then compared to the plurality of datum locations. However, the number of candidate detected edges in this process, should be higher than the number of datum location, so that some edges can be rejected.

In the present example, the set of datum locations includes eight expected edges and the set of candidate detected edges equals ten datum edges. The first step to be performed is the determination of which group of eight candidate detected edges are the best fit for the eight datum edges. This is performed by determining, for each potential group of eight candidate detected edges a "figure of merit." The figure of merit is calculated by comparing the position of each detected edge within a subset, containing "max edges in subset" (e.g., 8 in this example) to each datum position, and totaling up the offsets for all potential edges within the subset. The figure of merit for each subset of candidate edges is calculated as follows:

$$\sum_{j=1}^{max\ edges\ in\ subset} \left| \sum_{i=1}^{Max\ Datum} |\text{edge location}(j) - \text{datum location}(i)| \right|$$

This is calculated for all possible n-candidate subsets, able to be selected from the candidate edges. The subset of edges, having the lowest figure of merit is selected to be the best match to the datum positions and this set is then used in further processing to determine an image offset as described above.

As can be seen, using a process like this, spurious edges will be rejected from further consideration in calculating the image offset. However, the present inventors have additionally determined that the spurious edges can provide useful information as to the condition of the film being scanned.

For clean, undamaged film, the set of eight edges with the lowest figure of merit should also be the set of edges with the highest peak value; that is, there should not be any edges within the region of interest which are stronger than the edges of the perforations. However, in the event that the film is soiled with dust or dirt, scratched, torn or the like, or the edges of the perforations are damaged, there may well exist stronger edges within the candidate edges detected.

In a preferred form, the strength of each edge is determined using the output of the second edge detection filter. In the event that any candidate edge which was not selected in the subset of edges for determining the image offset has a peak value higher than any edge within the selected subset, an output signal can be generated to indicate a fault condition exists. The fault condition could be that dirt or dust or damage exists on the film at the frame presently being scanned. So, returning to FIG. 4, the peaks indicated by 404 and 406 will be found to not be within the eight best aligned candidate edges, because they will contribute high edge offsets to any subset of candidate edges that they are a part of, and thus they will be rejected from further processing to determine the image offset. However, because their peaks, as illustrated in FIG. 4C, are higher than those of any one (in this case all) of the peaks within the selected subset of edges, an indication will be given that there is a problem with the region of interest and the crack 400 exists.

Returning now to a concrete example of how statistical analysis using a measure of central tendency can be used to select edges for calculating the image offset—for a 35 mm film, after rejecting any spurious detective edges, the selected subset of candidate edges are compared to the eight in the datum set and the relative displacement from the datum for each of the eight edges is calculated. Each edge is placed in bin according to the size of a relative displacement from its corresponding datum location. In this example, the inventors have found a bin size of 14 red Bayer pixels useful. Once all of the edges are binned, if there is a bin with at least four edges within it, it is determined that the edges within that bin will provide the most reliable measure of the image offset to be applied. Those edges are then selected, and an average offset for the group is determined. This average offset is then used as the image offset for correcting the position of the captured frame corresponding to the detected perforations.

In the event that other gauge films are being scanned, different numbers of perforations will be analyzed and accordingly different numbers of edges will also be present. Accordingly, in one example if a 16 mm gauge film is being scanned it may be suitable to only require a pair of edges within a bin to deem that bin sufficiently representative of the image offset to use those edges for further processing.

In an alternative embodiment a different method of determining an image offset using a comparison between the detected edges and datum locations can be performed. In this example, a comparison is performed between the output of the edge detection filter (e.g., the output of FIG. 3D or 4D) and the datum edges of FIG. 3E or 4E respectively. This comparison can involve performing a cross-correlation between the datum positions and edge detection filter output, to determine the image offset which makes the edge detection filter output best match the datum locations. In this case, the output of the cross correlation at each possible offset can be used as the figure of merit, and the offset with the best figure of merit is preferably chosen as the images offset value.

The output of the edge detection filter at the determined positions (i.e., those positions that correspond to best image offset) could be used as the selected subset of edges against which to identify spurious edges, using the techniques described above.

Figure 5A:
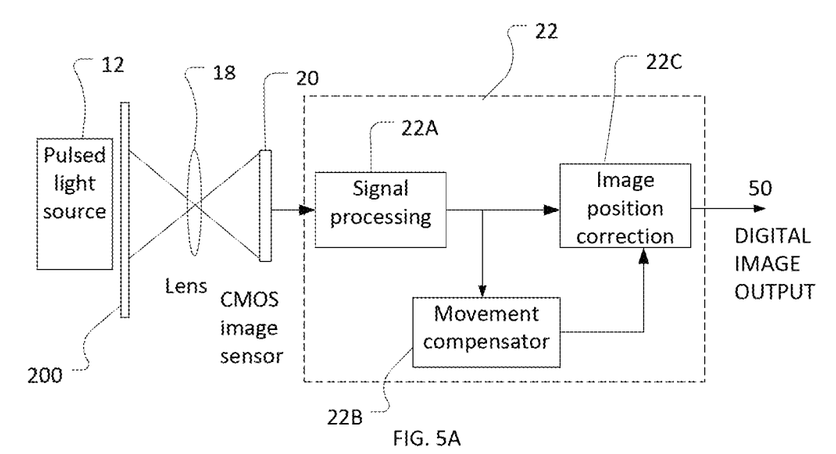
FIGS. 5A and 5B each show block diagrams of exemplary film scanning systems which each implement an embodiment of the present disclosure.
Figure 5B:
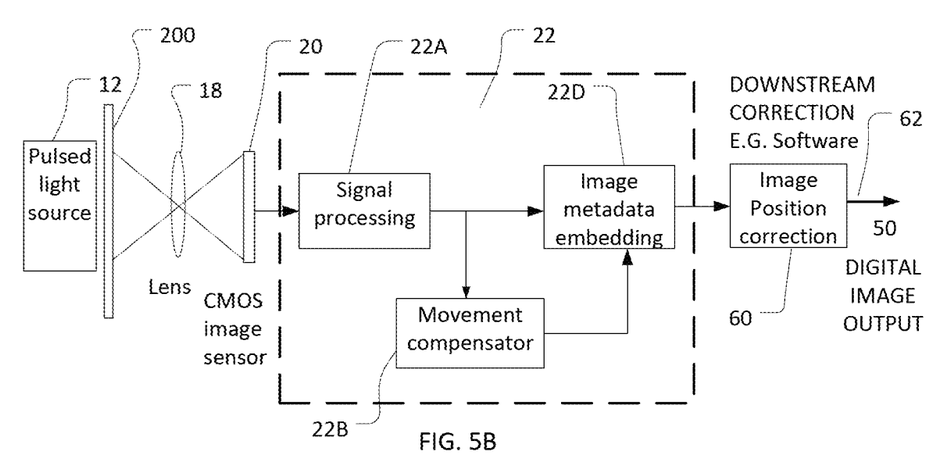

Once the image offset is determined, this image offset can be used in a variety of ways to control use of and/or correct the captured frame of the film. FIGS. 5A and 5B illustrate two such examples. As can be seen, FIGS. 5A and 5B resemble the system of FIG. 1 and common components have been given the same reference numeral. The example of FIG. 5A includes a data processing system that includes a signal processing front end 22a which performs early stage image processing as would be appreciated by those skilled in the art. A movement compensation system 22b is provided which calculates the image offset using a method according to an embodiment of the present disclosure. The movement compensation system 22b analyses the region of interest and for each frame it determines an image offset output and also any alert signals indicating the presence of a fault such as dust, dirt or degradation of the perforations.

The digitized, captured frames are passed to the image position correction module along with the corresponding image offset output, and image position correction is performed directly by the image position correction module 22c. In this case, direct video signal output 50 is generated by the image position correction module 22*c*. In a preferred form, the digital image output 50 is a HDMI signal or other suitable video output signal, which can be used directly by a monitor or other rendering device to playback the captured frame data. As would be appreciated, the image position correction module 22*c* will apply the necessary position corrections of each frame in real time so that the digital image output 50 has a stable video output.

FIG. 5B represents a system slightly different to that of FIG. 5A, in that rather than outputting a video signal suitable for direct playback at a monitor or the like, a data file containing data representing the sequence of digitized video images is generated. In this case, rather than performing direct adjustments to the image position correction using the image position correction module 22*c*, metadata can be generated and inserted into the data file using an image data embedding module 22*d*. The metadata can then be stored and transmitted along with the data representing the captured image frame. The output 60 from the system of FIG. 5B can be stored on a mass storage device for later use or passed straight to a downstream processing device for video processing of types known to those skilled in the art. The image offset metadata can be extracted by downstream image position correction system 62 to enable correct alignment of the captured frames in a subsequently generated digital image output 50.

As can be seen from the foregoing, embodiments of the present disclosure can be used to correct for positional errors in scanning frames of film during digitization such that they can be subsequently reproduced in a stable fashion. It should be appreciated, that unlike feedback systems which adjust the transport film location or the location of the light source or imager to correct the capture of subsequent frames, the present disclosure enables post-capture correction of captured frames from a film.

It will be understood that the disclosure in this specification extends to all alternative combinations of two or more of the individual features mentioned or evident from the text or drawings. All of these different combinations constitute various alternative aspects of the disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of scanning a film of a type including a film substrate carrying a sequence of image frames and a multiplicity of transport perforations spaced apart along the film at a location adjacent the sequence of image frames in a predetermined positional relationship with said image frames, wherein said method includes:
   illuminating a portion of the film including at least a portion of one or more image frames to be scanned;
   capturing light transmitted through the film so as to acquire a digitized image including a captured frame comprising a digitized image of at least a portion of at least one of said image frames, and at least a portion of a plurality of said transport perforations;
   processing the digitized image including the portion of the plurality of transport perforations to detect a plurality of edges;
   determining an image offset corresponding to at least the captured frame on the basis of a comparison between a plurality of said detected edges and corresponding datum locations; and
   generating a signal representing the image offset to enable alignment of at least the captured frame,
   wherein processing the digitized image and determining the image offset include:
      determining a first plurality of detected edges, and comparing said first plurality of detected edges to a second plurality of datum locations, wherein the number of detected edges exceeds the number of datum locations; and
      selecting a subset of detected edges from the first plurality of detected edges from which to determine the image offset.

2. The method of claim 1 wherein processing the digitized image to detect a plurality of edges includes:
   detecting edges within a region of interest within the digitized image; and
   comparing at least a subset of the detected edges to a plurality of datum locations representing the expected location of an edge.

3. The method of claim 1 wherein processing the digitized image to detect a plurality of edges includes detecting edges extending in a direction transverse to a length of the film by:
   averaging a plurality of pixel values within a region of interest in plurality of bands running transverse to the length of the film, to generate an array containing a corresponding plurality values each corresponding to a different location along the length of the film.

4. The method of claim 3 wherein processing the digitized image to detect a plurality of edges includes applying an edge detection filter to the array.

5. The method of claim 1 wherein determining an image offset on the basis of a comparison between a plurality of said detected edges and corresponding datum location includes:
   for a plurality of detected edges, comparing the location of the edges to a plurality of datum locations and determining the image offset from the plurality of detected edges.

6. The method of claim 1 wherein the method includes, for each edge in the selected subset of detected edges, determining an edge offset from a corresponding datum location.

7. The method of claim 6 wherein the method includes:
   determining the image offset on the basis of a plurality of edge offsets.

8. The method of claim 7 which further includes:
   determining a measure of central tendency of the determined edge offsets; and
   determining the image offset on the basis of those detected edges within a predefined distance from said central tendency measure.

9. The method of claim 1 wherein determining an image offset on the basis of a comparison between a plurality of said detected edges and corresponding datum locations includes:
   determining a correlation between an output of an edge detection filter and a plurality of datum locations representing an expected location of an edge.

10. The method of claim 9 wherein the image offset is determined on the basis of the offset producing the best correlation between the output of the edge detection filter and the plurality of datum locations representing the expected location of the edge.

11. The method of claim 1 wherein the method further includes:
   determining a fault condition in the event that a detected edge exists which has a higher amplitude than an edge within the selected subset of detected edges.

12. The method of claim 9 wherein the method further includes:
   determining a fault condition in the event that a detected edge exists which has a higher amplitude than an edge from which the image offset is determined.

13. The method of claim 1, which includes generating metadata representing an image offset to be applied to a captured frame.

14. The method of claim 13 which includes:
   storing said metadata in a data file with data representing the captured frame.

15. The method of claim 13, which includes generating a control signal to be applied to a video reproduction apparatus, for directly adjusting a relative position of successive captured frames during image reproduction.

16. A method of identifying a fault in a process of scanning a film of a type including a film substrate carrying a sequence of image frames and a multiplicity of transport perforations spaced apart along the film at a location adjacent the sequence of image frames in a predetermined positional relationship with said image frames, wherein said method includes:
   illuminating a portion of the film including at least a portion of one or more image frames to be scanned;
   capturing light transmitted through the film so as to acquire a digitized image including a captured frame comprising a digitized image of at least a portion of at least one of said image frames, and at least a portion of a plurality of said transport perforations;
   processing the digitized image including the portion of the plurality of transport perforations to detect a location of a plurality of edges;
   determining a first plurality of detected edges, and comparing said first plurality of detected edges to a second plurality of datum locations, wherein the number of detected edges exceeds the number of datum locations;
   selecting a subset of detected edges from the first plurality of detected edges from which to determine an image offset; and
   determining a fault condition in the event that a detected edge exists which has a higher amplitude than an edge within the selected subset of detected edges.

17. The method of claim 16 which includes sending a signal indicating a fault condition.

18. A film scanning apparatus including:
   a light source;
   an image sensor arranged to capture light transmitted through the film so as to acquire a digitized image including, a captured frame comprising a digitized image of at least a portion of at least one of said image frames, and at least a portion of a plurality of transport perforations; and
   one or more data processors arranged to process acquired image data;
   said film scanning apparatus being configured to:
      illuminate a portion of the film including at least a portion of one or more image frames to be scanned;
      capture light transmitted through the film so as to acquire a digitized image including a captured frame comprising a digitized image of at least a portion of at least one of said image frames, and at least a portion of a plurality of said transport perforations;
      process the digitized image including the portion of the plurality of transport perforations to detect a plurality of edges;
      determine an image offset corresponding to at least the captured frame on the basis of a comparison between a plurality of said detected edges and corresponding datum locations; and
      generate a signal representing the image offset to enable alignment of at least the captured frame,
   wherein, to process the digitized image and determining the image offset, said film scanning apparatus is configured to:
      determining a first plurality of detected edges, and comparing said first plurality of detected edges to a second plurality of datum locations, wherein the number of detected edges exceeds the number of datum locations; and
      selecting a subset of detected edges from the first plurality of detected edges from which to determine the image offset.

19. The film scanning apparatus of claim 18 wherein the one or more data processors is arranged to determine a correlation between an output of an edge detection filter and a plurality of datum locations representing an expected location of an edge.

* * * * *